United States Patent
Masini et al.

(10) Patent No.: US 9,503,393 B2
(45) Date of Patent: Nov. 22, 2016

(54) S-GW RELOCATION AND QOS CHANGE WITHOUT MOBILITY

(71) Applicant: Telefonaktiebolaget L M Ericsson (publ), Stockholm (SE)

(72) Inventors: Gino Masini, Stockholm (SE); Martin Israelsson, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 14/360,702

(22) PCT Filed: May 5, 2014

(86) PCT No.: PCT/SE2014/050547
§ 371 (c)(1),
(2) Date: May 27, 2014

(87) PCT Pub. No.: WO2015/020582
PCT Pub. Date: Feb. 12, 2015

(65) Prior Publication Data
US 2015/0043531 A1    Feb. 12, 2015

Related U.S. Application Data
(60) Provisional application No. 61/863,685, filed on Aug. 8, 2013.

(51) Int. Cl.
*H04L 12/927* (2013.01)
*H04W 36/12* (2009.01)
(Continued)

(52) U.S. Cl.
CPC ........ *H04L 47/805* (2013.01); *H04W 36/0011* (2013.01); *H04W 36/0083* (2013.01); *H04W 36/12* (2013.01); *H04W 36/38* (2013.01); *H04W 76/045* (2013.01); *H04L 47/824* (2013.01)

(58) Field of Classification Search
CPC ......... H04W 76/045; H04W 36/0011; H04W 36/0083; H04W 36/12; H04W 36/38; H04L 47/805; H04L 47/824
See application file for complete search history.

(56) References Cited

U.S. PATENT DOCUMENTS

| | | | | |
|---|---|---|---|---|
| 2010/0248643 | A1* | 9/2010 | Aaron | H04L 1/0002 455/68 |
| 2013/0083773 | A1* | 4/2013 | Watfa | H04W 36/0033 370/331 |
| 2013/0148597 | A1* | 6/2013 | Lee | H04W 72/1226 370/329 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.9.0, Mar. 2014, 1-210.

(Continued)

*Primary Examiner* — Joshua Kading
(74) *Attorney, Agent, or Firm* — Murphy, Bilak & Homiller, PLLC (57) ABSTRACT

A method in a network node for handling a relocation of a data flow of a User Equipment, UE, from a first GateWay, GW, to a second GW is provided. The network node receives (401) a message from a core network node. This message is an Enhanced Radio Access Bearer, E-RAB, modify request message. The message comprises one or more parameters for the relocation of the data flow for one or more respective E-RABs, wherein the one or more parameters comprises one or more Quality of Service, QoS, parameters. The message further comprises an indication, indicating whether or not to ignore the QoS parameters. When the QoS parameter is indicated to be ignored, the network node ignores the QoS parameters in the message. When the QoS parameters are indicated not to be ignored, the network node modifies the QoS of the data flow according to the QoS parameters in the message.

28 Claims, 6 Drawing Sheets

(51) Int. Cl.
*H04W 36/00* (2009.01)
*H04W 36/38* (2009.01)
*H04W 76/04* (2009.01)
*H04L 12/911* (2013.01)

(56) References Cited

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.1.0, Jun. 2013, 1-291.

Unknown, Author, "SGW Relocation for SIPTO at Local Network", Alcatel-Lucent, 3GPP TSG-RAN WG3 Meeting #80, R3-130943, Fukuoka, Japan, May 20-24, 2013, 1-4.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.0.0, Dec. 2011, 1-194.

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.0.0, Jun. 2012, 1-258.

3GPP, "3rd Generation Partnership Project; Technical Specification Group Services and System Aspects; Local IP access (LIPA) mobility and Selected IP Traffic Overload (SIPTO) at the local network (Release 12)", 3GPP TR 23.859 V12.0.0, Mar. 2013, 1-67.

3GPP, "3rd Generation Partnership Project; Technical Specification Group Services and System Aspects; Local IP Access and Selected IP Traffic Offload (LIPA-SIPTO) (Release 10) The present", 3GPP TR 23.829 V10.0.1, Oct. 2011, 1-43.

\* cited by examiner

S-GW RELOCATION AND QOS CHANGE WITHOUT MOBILITY

TECHNICAL FIELD

Embodiments herein relate to a user equipment, a network node and methods therein. In particular, it relates to a method for handling a relocation of data flow of a UE from a first GW to a second GW.

BACKGROUND

Communication devices such as User Equipments (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network.

UEs may further be referred to as wireless terminals, wireless device, mobile terminals and/or mobile stations, mobile telephones, cellular telephones, laptops, tablet computers or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another user equipment or a server. The UE may also be a machine to machine communication device that serves as a data communication modem or is built in to equipment communicating data with server without human interaction.

The cellular communications network covers a geographical area which is divided into cell areas, wherein each cell area being served by an access node. A cell is the geographical area where radio coverage is provided by the access node.

The access node may further control several transmission points, e.g. having Remote Radio Units (RRUs). A cell can thus comprise one or more access nodes each controlling one or more transmission/reception points. A transmission point, also referred to as a transmission/reception point, is an entity that transmits and/or receives radio signals. The entity has a position in space, e.g. an antenna. An access node, also referred to as a network node, is an entity that controls one or more transmission points. The access node may e.g. be a base station such as a Radio Base Station (RBS), enhanced Node B (eNB), eNodeB, NodeB, B node, or BTS (Base Transceiver Station), depending on the technology and terminology used. The base stations may be of different classes such as e.g. macro eNodeB, micro eNodeB, home eNodeB or pico base station, based on transmission power and thereby also cell size.

Further, each access node may support one or several communication technologies. The access nodes communicate over the air interface operating on radio frequencies with the UEs within range of the access node. In the context of this disclosure, the expression Downlink (DL) is used for the transmission path from the base station to the mobile station. The expression Uplink (UL) is used for the transmission path in the opposite direction i.e. from the UE to the base station.

In 3rd Generation Partnership Project (3GPP) Long Term Evolution (LTE), base stations, which may be referred to as eNodeBs or even eNBs, may be directly connected to one or more core networks.

Selected IP Traffic Offload (SIPTO) at a Local Network, SIPTO@LN, with a stand-alone gateway is introduced in 3GPP TS 36.300 v. 11.9.0. Such an architecture enables routing of IP traffic from a User Equipment (UE) through a stand-alone Local GateWay (L-GW) without the need to go through the backhaul into a core network and back. The backhaul comprises intermediate links between a core network and network nodes in the cellular communications network.

The stand-alone gateway has local connectivity to a set of network nodes, such as an eNB and/or a HeNB. Such a network is also known as a Local Home Network (LHN). The LHN is identified by an LHN Identity (ID) signaled to the core network over an S1 interface. The S1 interface allows data transfer between the core network node and the network nodes. Knowing the LHN ID, a core network node, such as an MME, can allocate and relocate the S-GW to the most appropriate L-GW according to the UE location and the UE subscription. SIPTO may be applicable to both (e)NBs and H(e)NBs. If the SIPTO traffic offload is performed at the Local Network (LN), it is defined as SIPTO@LN.

Current SIPTO@LN does not support mobility of the UE between cells. The SIPTO@LN data connection is torn down on handover unless the LHN ID of the target network node, such as a target eNB, is the same as that of the source network node, in which case they are both connected to the same L-GW. For this reason, the core network node can also signal to the network node a relocation of gateway independently from mobility events, as disclosed in 3GPP TS 23.401 v. 12.1.0, Section 5.10.4. How to introduce this functionality in the S1AP protocol is currently being discussed by 3GPP RAN3.

When a UE moves in or out of a LHN, it may also be necessary for the MME to modify the Quality of Service (QoS) of the traffic flows Enhanced Radio Access Bearers (E-RABs). This can for example be due to the fact that the stand-alone L-GW has a different backhaul than the packet gateways in the core network and it is therefore able to provide a different, possibly even better, QoS to the UE. Currently such a modification of QoS parameters for one or more E-RABs is signaled using an S1AP E-RAB Modify procedure. S1AP is the signaling service between the RAN and the core network and fulfills the S1 Interface functions, such functions may for instance be E-RAB management functions, mobility functions for the UE, error reporting and status transfer.

A problem arises from the fact that in the current S1AP protocol, the QoS parameters are mandatory in the initiating message for the E-RAB Modify procedure, i.e. they are always comprised in an E-RAB MODIFY REQUEST message sent from the core network node to the network node.

The parameters contained within the message are also referred to as Information Elements (IEs). One of the IEs sent to modify the QoS parameters is the Non Access Stratum—Packet Data Unit (NAS-PDU) IE, which is the first packet of data to which the new parameters must be applied. Due to how the protocol is constructed, even if the message is extended with new IEs, the existing mandatory IEs are always interpreted by the receiving node. Hence a resending of a dummy or empty NAS-PDU IE if the whole message only contains e.g. a S-GW relocation, is likely to cause PDU counter mismatches and/or wrong data in the traffic flow at the receiving node. This also puts the burden on the core network node to re-send the existing, unchanged, QoS parameters for the E-RAB being relocated.

Another solution would be to introduce a new S1AP Procedure for S-GW relocation. This however has a bigger impact on the current protocol, and does not solve the issue. The core network node, such as an MME, would need to initiate two separate procedures toward the eNB, one to relocate the S-GW and another to change the QoS of the bearers. This leads to increased processing times as well as an increased load on the network.

A further solution would be to ignore the QoS parameters when the E-RAB MODIFY REQUEST message carries an S-GW relocation. This solves the problem above, but it would still require two separate procedure instances to relocate the S-GW and to modify the QoS.

SUMMARY

It is therefore an object of embodiments herein to provide an improved procedure to signal a relocation of a data flow from one GW to another.

According to a first aspect of embodiments herein, the object is achieved by a method in a network node for handling a relocation of a data flow of a User Equipment, UE, from a first GateWay, GW, to a second GW. The network node receives a message from a core network node. This message is an Enhanced Radio Access Bearer, E-RAB, modify request message. The message comprises one or more parameters for the relocation of the data flow for one or more respective E-RABs, wherein the one or more parameters comprises one or more Quality of Service, QoS, parameters. The message further comprises an indication, indicating whether or not to ignore the QoS parameters. When the QoS parameter is indicated to be ignored, the network node ignores the QoS parameters in the message. When the QoS parameters are indicated not to be ignored, the network node modifies the QoS of the data flow according to the QoS parameters in the message.

According to a second aspect of embodiments herein, the object is achieved by a method in a core network node for assisting the network node in relocating the data flow from a first GateWay, GW, to a second GW. The core network node sends a message to the network node, which message is an Enhanced Radio Access Bearer, E-RAB, modify request message. The message comprises one or more parameters for the relocation of the data flow for one or more E-RABs, wherein the one or more parameters comprises one or more Quality of Service, QoS, parameters. The message further comprises an indication, indicating whether to ignore the QoS parameters or not. When the QoS parameter is indicated to be ignored, it is an indication to the network node (110) to ignore the QoS parameter in the message. When the QoS parameter is indicated not to be ignored, it is an indication to the network node (110) to modify the QoS of the data flow according to the QoS parameter in the message.

According to a third aspect of embodiments herein, the object is achieved by a network node for handling a relocation of a data flow from a first GateWay, GW, to a second GW. The network node is configured to receive a message from a core network node, which message is an Enhanced Radio Access Bearer, E-RAB, modify request message. The message comprises one or more parameters for the relocation of the data flow for one or more respective E-RABs, wherein the one or more parameters comprises one or more Quality of Service, QoS, parameters. The message further comprises an indication, indicating whether or not to ignore the QoS parameters. The network node further is configured to ignore the QoS parameter in the message when the QoS parameters are indicated to be ignored. The network node further is configured to modify the QoS of the data flow according to the QoS parameter in the message, when the QoS parameters are indicated not to be ignored.

According to a fourth aspect of embodiments herein, the object is achieved by a core network node for assisting a network node in relocating a data flow from a first GateWay, GW, to a second GW. The core network node is configured to send a message to the network node, which message is an Enhanced Radio Access Bearer, E-RAB, modify request message. The message comprises one or more parameters for the relocation of the data flow for one or more E-RABs, wherein the one or more parameters comprises one or more Quality of Service, QoS, parameters. The message further comprises an indication, indicating whether to ignore the QoS parameters or not. When the QoS parameter is indicated to be ignored, it is an indication to the network node (110) to ignore the QoS parameter in the message. When the QoS parameter is indicated not to be ignored, it is an indication to the network node (110) to modify the QoS of the data flow according to the QoS parameter in the message.

By signaling a S-GW relocation and QoS change for multiple E-RABs and indicating whether or not the QoS parameters shall be considered by the network node either a relocation of S-GW or a change of QoS, or both at the same time, to any E-RAB independently in a single message is possible. This improves the signaling efficiency and the handling of the relocation of data flow, since a one-shot modification of all the concerned E-RABs by the UE can be achieved.

A further advantage with embodiments herein is that the core network node, such as the MME, is able to signal both S-GW relocation and QoS modification at the same time to the network node, while keeping the two functionalities independent and reusing the existing S1AP message. Reusing the existing S1AP message allows a backward compatibility with older network nodes.

BRIEF DESCRIPTION OF THE DRAWINGS

Examples of embodiments herein are described in more detail with reference to attached drawings in which.

DETAILED DESCRIPTION

Embodiments herein disclose a mechanism to independently signal both a relocation of any data flow in a packet connection from one gateway to another and a modification of a QoS parameter of any data flow associated with the connection, in the same packet data message.

Figure 1:
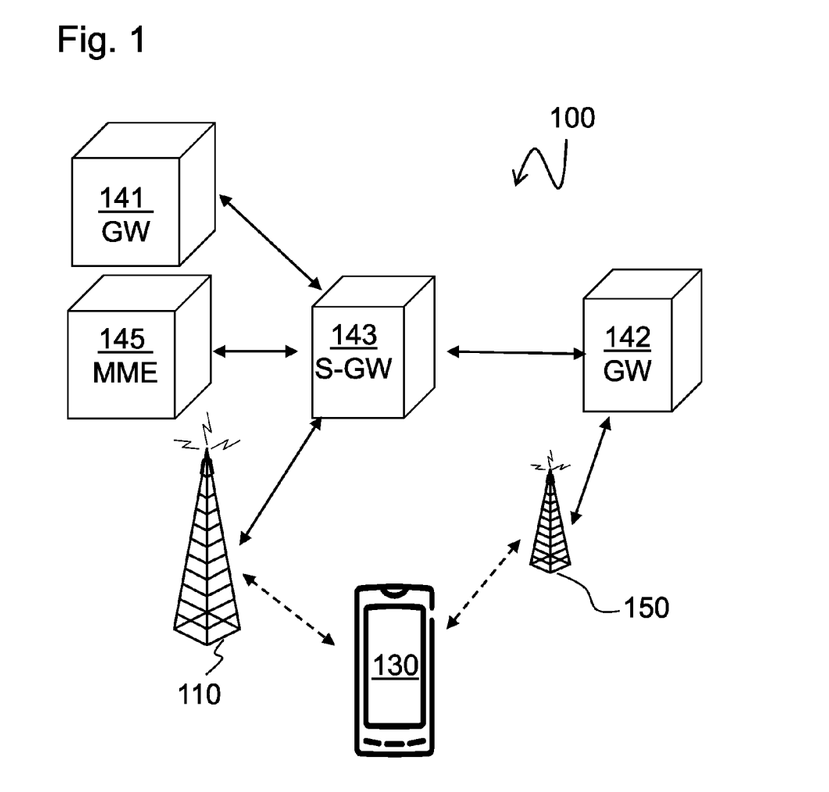
FIG. 1 is a block diagram illustrating embodiments of a network in an LTE architecture.

FIG. 1 depicts an example of a wireless communications network 100. The wireless communications network 100 may be a wireless or a cellular network e.g. based on any of 3rd Generation, Universal Mobile Telecommunications System (UMTS), Wideband Code Division Multiple Access (WCDMA), High Speed Packet Access (HSPA) and 4th Generation (4G), Evolved Packet System (EPS), LTE, LTE Advanced (LTE-A). It may also be a Global System for Mobile Communications (GSM) network, any 3GPP cellular network, Worldwide Interoperability for Microwave Access (WiMAX), or any cellular network or system.

The wireless communications network 100 comprises a plurality of network nodes whereof two are depicted in FIG. 1. One of those is a network node 110. The network node 110 may be a base station, such as a radio network node, a radio base station, an eNodeB, a NodeB or any other network node capable of communicating with a UE 130. The network node 110 may comprise, or be co-located with one or more gateways.

The wireless communications network 100 further comprises one or more gateways, wherein two gateways, a first gateway 141 and a second gateway 142 are depicted in FIG. 1.

The first gateway 141 may be comprised in a core network of the wireless communications network 100 and may e.g. connect to external networks, such as the internet. Such a gateway is often referred to as a Packet Data Network Gateway (P-GW).

In some embodiments the second gateway 142 may be a stand-alone gateway which has local connectivity to a set of local network nodes, such as eNBs and/or HeNBs, known as a Local Home Network (LHN). Such a local gateway (L-GW) is also known as a SIPTO gateway or a SIPTO@LN Local Gateway (L-GW). Hence, in some embodiments, the network node 110 supports radio access bearers for both SIPTO operation and also SIPTO at Local Network (LN).

The wireless communications network 100 further comprises one or more Serving Gateways (S-GW), such as an S-GW 143 depicted in FIG. 1. The S-GW 143 may be connected to one or more P-GW(s), L-GW(s) and/or UEs. The S-GW 143 transports data traffic between a UE and the external networks. In FIG. 1 and in FIG. 2, as described below, the S-GW 143 is depicted to be connected to the first gateway 141 and to the 25 second gateway 142. However in other embodiments, the first gateway 141 and the second gateway 142 may be connected to separate S-GWs.

A UE 130 operates in the wireless communications network 100. The UE 130 may e.g. be a wireless device, a mobile wireless terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network.

A core network node 145, such as a Mobility Management Entity (MME) or the like, is depicted in FIG. 1. The core network node 145 handles signaling related to mobility and security for the wireless communication network 100 and is e.g. responsible for the tracking and the paging of the UE 130.

It should be noted that the nodes discussed above are logical nodes. In an actual physical implementation, several of the nodes, such as the core network node 145, the P-GW 141 and S-GW 143, may be combined into a single physical node.

Figure 2:
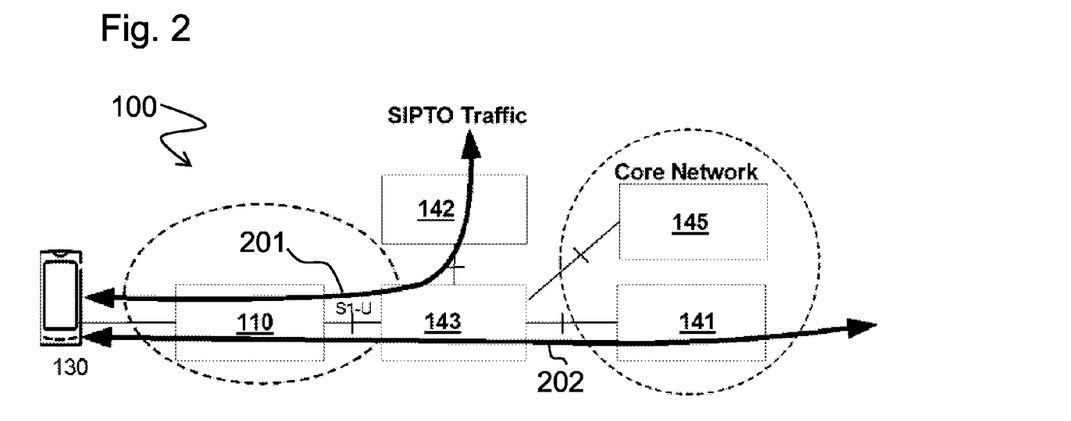
FIG. 2 is a block diagram illustrating embodiments of a wireless communications network.

Initially, when a stand-alone gateway is identified by the UE 130, this fact is signaled via the network node 110 to the core network e.g. over an S1 interface, as depicted in FIG. 2. The stand-alone gateway may be identified by a Local Home Network ID (LHN ID). It may be beneficial to relocate the data flow to the stand alone gateway, in order to reduce the load on the core network and/or to provide a more direct connection path for traffic to outside networks. According to embodiments herein, the network node 110 sends the LHN ID to the core network node 145. Knowing the LHN ID, the core network node 145, such as the MME, can then take the LHN into consideration when allocating and relocating traffic from the S-GW 143 to the most appropriate GW, e.g. according to a location of the UE 130 and to the LHN ID of the source and target eNBs. Herein, the source eNB is the eNB currently connected to, and the target eNB is the eNB the traffic may be relocated to.

Relocating the S-GW 143 to a LHN enables routing of IP traffic from the UE 130 through 201 the stand-alone GW 142 without the need to go through the backhaul 202 into the core network and back via the P-GW 141, as depicted in FIG. 2.

It should be noted that allocating and relocating the S-GW 143 may e.g. mean connecting to a different P-GW than the current one, or to change to a different S-GW which may be connected to a different P-GW.

When the UE 130 moves to an LHN it may also be necessary for the core network node 145 to modify the QoS of the data connections from the UE 130 to the S-GW 143, e.g. due to the different backhaul of the new stand-alone gateway. The new stand-alone gateway shall here be interpreted as a different gateway than the one previously connected to.

Figure 3:
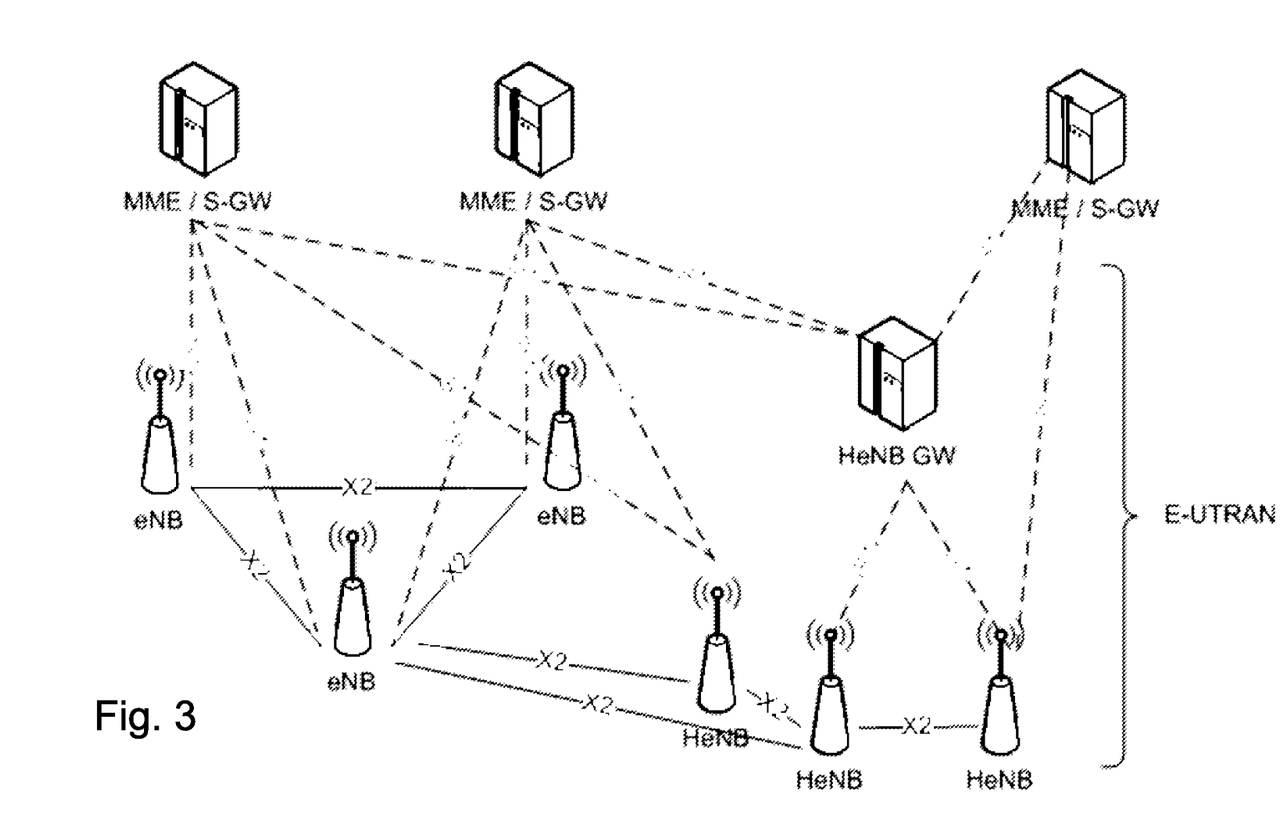
FIG. 3 is a block diagram illustrating embodiments of a wireless communications network.

An example of an architecture of an LTE system in which embodiments herein may be implemented is shown in FIG. 3. The LTE system may comprise several network nodes 110, referred to as eNBs in FIG. 3, connected to each other over a logical interface X2. Each network node 110 is further connected to a core network node 145, referred to as an MME/S-GW in FIG. 3, over a logical interface S1. The eNBs may comprise an L-GW functionality for SIPTO. In FIG. 3 the L-GW is referred to as HeNB GW.

Embodiments of a method for handling a relocation of a data flow will first be described seen from a perspective of the network node 110, and afterwards embodiments of the method will be described seen from a perspective of the core network node 145.

Thus, example of embodiments of a method in the network node 110 for handling a relocation of a data flow of the UE 130 from the first GW 141 to the second GW 142 will now be described with reference to a flowchart depicted in FIG. 4.

Figure 4:
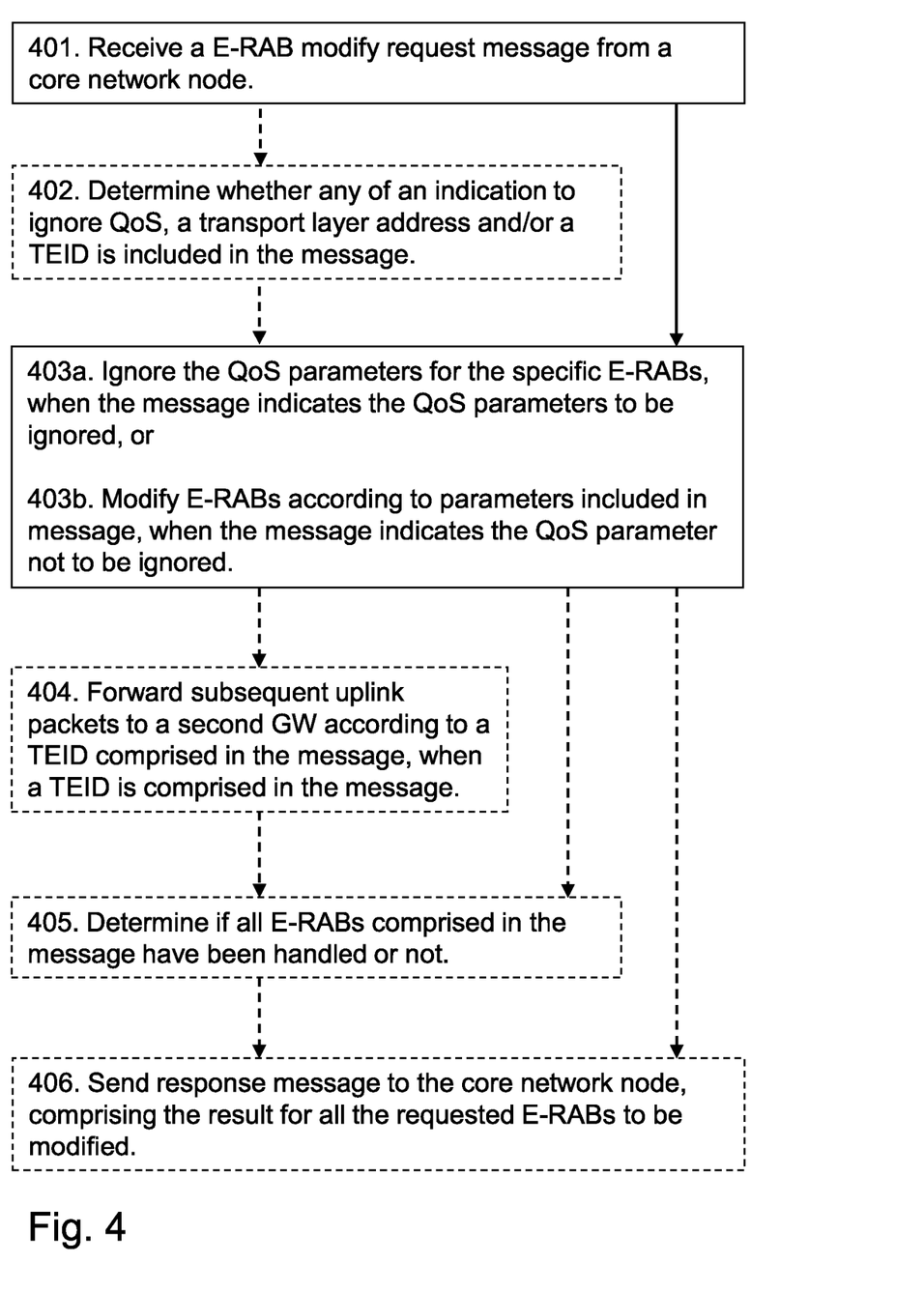
FIG. 4 is a flowchart depicting embodiments of a method in a network node.

It should be noted that although the flowchart has been drawn as a single flowchart, the three decisions marked with dashed boxes in FIG. 4 are independent of each other and could be drawn as three separate flowcharts. They may also be performed in any suitable order other than the illustrated. Thus, some of the method steps outlined below are optional. According to an example scenario the network node 110 is preparing to offload IP traffic at a local network via the local gateway 122. The method in the network node 110 comprises the following actions:

Action 401

Figure 6:
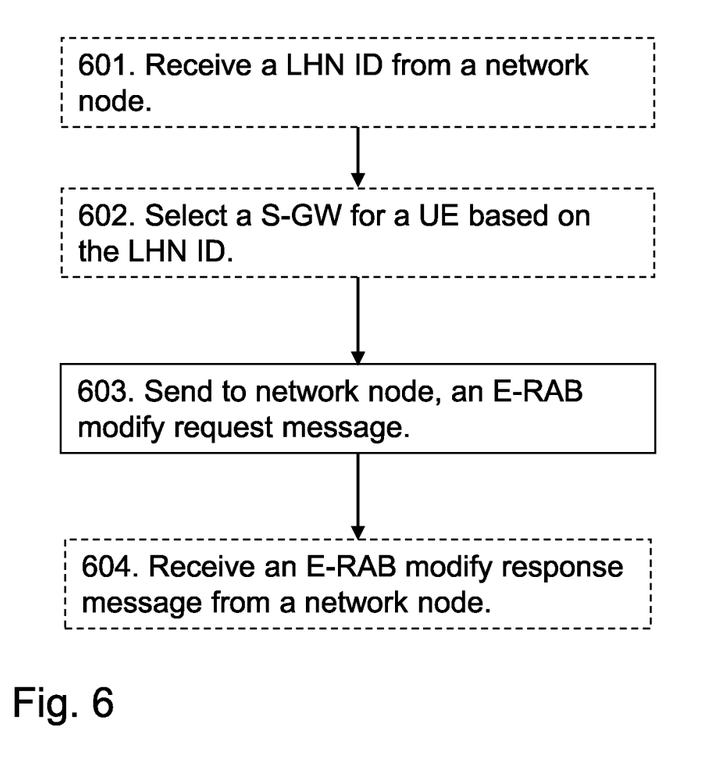
FIG. 6 is a signaling diagram illustrating embodiments of a method in a core network node.

The network node 110 receives a message from the core network node 145. The message is an E-RAB modify request message, which also may be referred to as an E-RAB MODIFY REQUEST message. This message may be used to initiate an E-RAB Modify procedure, as depicted in FIG. 6 below. The purpose of an E-RAB Modify procedure is to enable modifications of already established E-RABs for a given UE 130. The E-RAB modify request message comprises one or more parameters. The parameters are used for the relocation of the data flow for one or more respective E-RABs. At least one of the parameters included in the message is a QoS parameter. QoS parameters are defined in 3GPP TS 23.203 v. 11.3.0. The message further comprises an indication. The indication indicates whether the network node 110 shall ignore the QoS parameter or not. This indication may also be referred to as an "ignore QoS IE". When the QoS parameter is not ignored it may be used to modify the E-RABs for the UE 130.

In some embodiments herein the indication is a Boolean, which may be comprised in an IE in the message. In some of these embodiments, the Boolean is set to "true" when the network node 110 shall ignore the QoS parameter and to "false" when the QoS parameter is not to be ignored, for example when the QoS parameter is intended to be used to modify the E-RABs. Using a Boolean as indication has the benefit that including it even for a long list of E-RABs does not add any overhead to the message, compared to the benefit that only one single message is needed to signal the modifications for all E-RABs. Further, detecting if the message includes modified QoS parameters may be performed with a single check on whether the indication to ignore the QoS parameters is included. An indication that the QoS parameters can be ignored means the message does not comprise modified QoS parameters for that particular E-RAB and no processing of these parameters has to be performed. If an indication to ignore the QoS parameters is not included, the message decoding is performed as currently, with no additional logic involved. This enables maximum decoding speed of the message.

In some further embodiments, the Boolean is not included in the message when the QoS is not to be ignored. If the Boolean is not included in these embodiments, the default behavior of the E-RAB modify procedure applies, and the QoS parameters in the message for that E-RAB will be interpreted as for a regular E-RAB Modify Request message. In a regular E-RAB Modify Request message the parameters in the message are processed, even though the parameters may not be modified, i.e. may be the same as previously signaled.

According to some embodiments herein, the one or more parameters further comprise information about Non Access Stratum—Packet Data Unit (NAS-PDU). The NAS-PDU is the first packet data unit to which the signaled QoS shall apply.

In some embodiments the one or more parameters further comprises a Transport Layer Address, such as an S-GW Transport Layer Address. This Transport Layer Address may comprise an IP-Address of the GWs to indicate which GW the data flows shall be routed through.

In some alternative embodiments the one or more parameters further comprises a Tunnel Endpoint Identifier (TEID). Such a TEID may be comprised in an IE also known as an UL GTP TEID IE. The TEID may be used to identify the endpoints of the data flow. Herein the TEID is used to identify the P-GW to which the S-GW 143 shall be relocated.

Action 402

According to some embodiments, after having received the message from the core network node 145, the network node 110 determines whether or not any of an indication to ignore the QoS information or not, a transport layer address and/or a TEID are included in the message. This is done to identify which parameter changes that have to be performed by the network node 110.

Action 403a

When the E-RAB modify request message indicates that the QoS parameter in the message is to be ignored, the network node 110 ignores the QoS parameter during the E-RAB Modify procedure.

In some embodiments herein, the network node 110 also ignores the information about the NAS-PDU for the relevant E-RABs when the QoS parameters are indicated to be ignored.

By ignoring the QoS parameters and the information about the NAS-PDU when this is indicated in the message, the time and capacity needed to process the message is reduced.

Action 403b

When the indication indicates that the QoS parameters shall not be ignored, the network node 110 modifies the QoS of the data flow for the relevant E-RABs according to the QoS parameter included in the message.

In some embodiments the network node 110 further processes the NAS-PDU information.

The network node 110 may further modify the address of the S-GW 143 for the respective E-RABs according to the Transport Layer Address comprised in the message when the QoS of the data flow is indicated not to be ignored.

If the Transport Layer Address IE is included in the E-RAB MODIFY REQUEST message, the network node 110 may use the signaled Transport Layer Address as the new S-GW address for the relevant E-RAB(s) as defined in 3GPP TS 23.401 v. 12.1.0.

By modifying the address of the S-GW 143 according to the Transport Layer Address, the S-GW 143 relocates the data flow from a first GW 141 to a second GW 142. This second GW 142 may be any type of Packet Data Network Gateway, such as a P-GW or L-GW.

Note that when the indication is not included, the default behavior applies, so the parameters for that E-RAB will be interpreted as usual, i.e. all the parameters in the message will be processed.

Action 404

In some embodiments, when a TEID is included in the message, the network node 110 utilizes the signaled TEID to forward subsequent uplink packets for the relevant E-RAB(s) to the second GW 142 according to the TEID comprised in the message.

Action 405

In some embodiments, the network node 110 may determine if all E-RAB(s) comprised in the message have been handled or not. This is done to ensure that the E-RAB modify procedure has been successfully completed for all E-RABs. This is performed by comparing the parameters for the E-RABs comprised in the E-RAB Modify Request message with the parameters of the E-RAB after the E-RAB Modify procedure has been completed. If the E-RAB modify procedure has not been successfully completed, the network node 110 may restart the E-RAB modify procedure to complete the procedure according to the E-RAB modify request message.

Action 406

In some embodiments, the network node 110 further sends a response message to the core network node 145. Such a message may also be referred to as an E-RAB MODIFY RESPONSE message. This response message may comprise the result for all the requested E-RABs to be modified, such as a list of E-RABs which are successfully modified and, if any, a list of E-RABs which failed to be modified. The list of E-RABs which are successfully modified may be included in an IE in the message, which may be referred to as an E-RAB Modify List IE. The list of E-RABs which failed to be modified may be included in another IE in the message, which may be referred to as an E-RAB Failed to Modify List IE.

When the network node 110 reports unsuccessful modification of an E-RAB, a cause value may also be added to the response message. This cause value should be precise enough to enable the core network node 145 to know the reason for an unsuccessful modification, such as "Radio resources not available" or "Failure in the Radio Interface Procedure".

Figure 5:
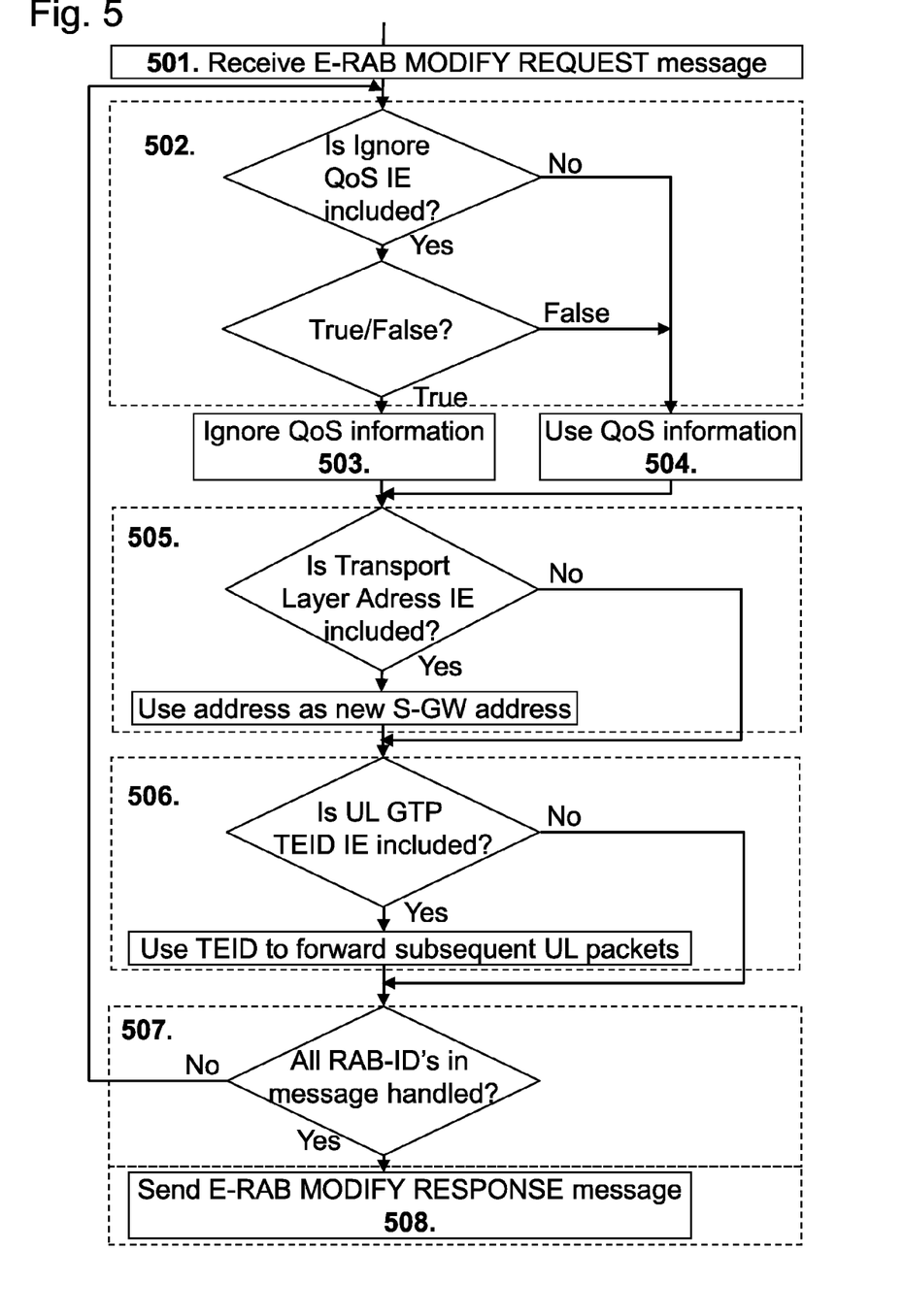
FIG. 5 is a flowchart depicting embodiments of a method in a network node.

Embodiments of the method in the network node 110 are also depicted in the flowchart in FIG. 5.

In Action 501 the network node 110 receives an E-RAB modify request message from the core network node 145. This action relates Action 401 described above.

In Action 502 the network node 110 may determine if an indication to ignore the QoS information is included in the message or not. If the indication is included, the network node further may determine whether the indication indicates to ignore the QoS parameters or not. This may be indicated by the indication being a Boolean and the Boolean being set to "true" when QoS shall be ignored and to "false" when QoS shall not be ignored. This step relates to Action 402 described above.

When the indication is included and indicates that the QoS parameter is to be ignored, the network node 110 ignores the QoS information in Action 503. This step relates to Action 403*a* described above.

When the indication is not included, or is included and indicates that the QoS parameter shall not be ignored, the network node 110 modifies the QoS of the data flow according to the QoS parameter included in the message. This is performed in Action 504, which relates Action 403*b* described above.

In a further embodiment, the network node 110 may further determine whether a transport layer address is included in the message. When a transport layer address is included, the network node may relocate the S-GW 143 according to the transport layer address included in the message in Action 505. This step relates to embodiments of Action 402 and 403*b* described above.

Action 506 shows an optional embodiment of the method. In this action the network node 110 may determine whether a TEID is included in the message and, if it is included, forward subsequent uplink packets according to the TEID comprised in the message. As can be seen, Action 506 relates to embodiments of Action 402 and 404 described above.

As discussed for Action 405 above, the network node 110 may in a further embodiment also determine if all E-RABs comprised in the message have been handled or not. This is performed in Action 507 in FIG. 5.

In Action 508, the network node 110 may also send a response message to the core network node 145. This message comprises the result of the modification for all E-RABs requested to be modified, which relates to Action 406 above.

Example of embodiments of a method in the core network node 145 for assisting a network node 110 in relocating a data flow of a UE 130 from a first GW 141 to a second GW 142 will now be described with reference to a flowchart depicted in FIG. 6. The method comprises the following actions, which actions may be taken in any suitable order. Dashed lines of boxes in FIG. 5 indicate that these actions are not mandatory.

Action 601

In some embodiments the core network node 145 receives a message comprising a LHN ID from a network node 110. The message may be any type of message related to the redirection of a data flow from one gateway to another, such as an INITIAL UE MESSAGE, UPLINK NAS TRANSPORT, HANDOVER NOTIFY and/or PATH SWITCH REQUEST messages. According to some embodiments, the LHN ID is contained in an IE in the message. This message is sent to inform the core network node 145 that the UE 130 is close to a LHN and that the data flow may be redirected to the LHN in order to reduce the load on the core network.

Action 602

When the LHN ID is included in the message, the core network node 145 may take it into account when selecting an S-GW for the UE 130. This selection may be done as specified in 3GPP TS 23.401 v. 12.1.0.

Action 603

The core network node 145 sends a message to the network node 110 to initiate an E-RAB Modify procedure, as depicted in FIG. 6. The message is an E-RAB modify request message, which also may be referred to as an E-RAB MODIFY REQUEST message. The purpose of the E-RAB Modify procedure is to enable modifications of already established E-RABs for a given UE 130. The E-RAB modify request message comprises one or more parameters. The parameters are used for the relocation of the data flow for one or more respective E-RABs. At least one of the parameters included in the message is a QoS parameter. QoS parameters are defined in 3GPP TS 23.203 v. 11.3.0. The message further comprises an indication. The indication indicates whether the network node 110 shall ignore the QoS parameter or not. When the QoS parameter is not ignored it may be used to modify the E-RABs for the one or more UEs.

In some embodiments herein the indication is a Boolean, which may be comprised in an Information Element (IE) in the message. In some of these embodiments, the Boolean is set to "true" when the network node 110 shall ignore the QoS parameter and to "false" when the QoS parameter is not to be ignored, for example when the QoS parameter is intended to be used to modify the E-RABs. Using a Boolean as indication has the benefit that including it even for a long list of E-RABs does not add any overhead to the message, compared to the benefit that only one single message is needed to signal the actions for all E-RABs. Further the detection of the modified QoS parameters can be performed by the network node 110 with a single check on whether the indication to ignore the QoS parameters is included. An indication that the QoS parameters can be ignored means the message does not comprise modified QoS parameters for that particular E-RAB and no processing of these parameters has to be performed. If an indication to ignore the QoS parameters is not included, the message decoding is performed as currently, with no additional logic involved. This enables maximum decoding speed of the message.

In some further embodiments, the Boolean is not included in the message when the QoS is not to be ignored. If the Boolean is not included, the default behavior of the E-RAB modify procedure applies, so the QoS parameters in the message for that E-RAB will be interpreted as for a regular E-RAB Modify Request message.

According to some embodiments herein, the one or more parameters further comprise information about Non Access Stratum—Packet Data Unit (NAS-PDU). The NAS-PDU is the first packet data unit to which the signaled QoS shall apply.

In some embodiments the one or more parameters further comprises a Transport Layer Address. The Transport Layer Address comprises an IP-Address of a GW and may be used to signal which GW the data flows shall be routed through.

In some alternative embodiments the one or more parameters further comprises a TEID. The TEID can be used to identify the path of the data flow from one gateway to another. In these embodiments the TEID is used to identify the Packet Data Network Gateway to which the S-GW 143 shall be relocated.

Action 604

The core network node 145 may, in some embodiments, receive a response message from the network node 110.

Such a message may also be referred to as an E-RAB MODIFY RESPONSE message. This response message may comprise the result for all the requested E-RABs to be modified, such as a list of E-RABs which are successfully modified and, if any, a list of E-RABs which failed to be modified. The list of E-RABs which are successfully modified may be included in an IE in the message, which may be referred to as an E-RAB Modify List IE. The list of E-RABs which failed to be modified may be included in another IE in the message, which may be referred to as an E-RAB Failed to Modify List IE.

When an unsuccessful modification of an E-RAB is reported, a cause value may also be added to the response message. This cause value should be precise enough to enable the MME to know the reason for an unsuccessful modification, such as "Radio resources not available" or "Failure in the Radio Interface Procedure".

The methods described above will now be described in more detail. As described above in Action 401 and 603, the core network node 145 may send the appropriate parameters for the S-GW relocation, such as an S-GW transport layer address and/or the E-RAB TEIDs, for the specific E-RAB in an E-RAB modify request message. For each E-RAB it may include the Boolean to signal whether to ignore the QoS information for that E-RAB or not. Such a modified E-RAB MODIFY REQUEST message may be constructed according to the table below.

TABLE 1 the E-RAB MODIFY REQUEST message.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Modified List | | 1 | | | YES | reject |
| >E-RAB To Be Modified Item IEs | | 1 ... <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>NAS-PDU | M | | 9.2.3.5 | | — | |
| >>Transport Layer Address | O | | 9.2.2.1 | | YES | reject |
| >>UL GTP TEID | O | | 9.2.2.2 | | YES | reject |
| >>Ignore QoS | O | | BOOLEAN | If included and set to "true", the E-RAB Level QoS Parameters and NAS-PDU IEs for this E-RAB are ignored. | YES | reject |

| Range bound | Explanation |
|---|---|
| maxnoofE-RABs | Maximum no. of E-RAB allowed towards one UE, the maximum value is 256. |

In some embodiments, the message comprises at least the IEs "MessageType" to identify that the message is an E-RAB modify request message, the "MME UE S1AP ID" to uniquely identify the UE 130 in the core network node 145, such as the MME, and the "eNB UE S1AP ID" to uniquely identify the UE 130 in the network node 110. Further the message comprises a list of the E-RABs to be modified. This list comprises the number of E-RABs to be modified, ranging from 1 to the maximum number of E-RABs that can be handled, in this case 256. The message also comprises the "E-RAB ID" to identify the E-RABs associated with the UE 130, the "E-RAB Level QoS Parameters" to set the QoS for each E-RAB and the "NAS-PDU" IE, which tells the network node 110 the first packet data unit to which the signaled QoS shall apply. The above mentioned IEs are all mandatory in the present embodiment, as indicated by the "M" in the presence block.

The message may also comprise one or more optional IEs, indicated by the "O" in the presence block. The optional IEs may be a "Transport Layer Address" IE, an "UL GTP TEID") IE to define the path of the data flow as described under Action 603, an "UE Aggregate Maximum Bit Rate" IE to define a maximum allowed throughput to a specific UE and/or an "Ignore QoS" IE to signal whether or not the QoS parameters shall be ignored.

Figure 7:
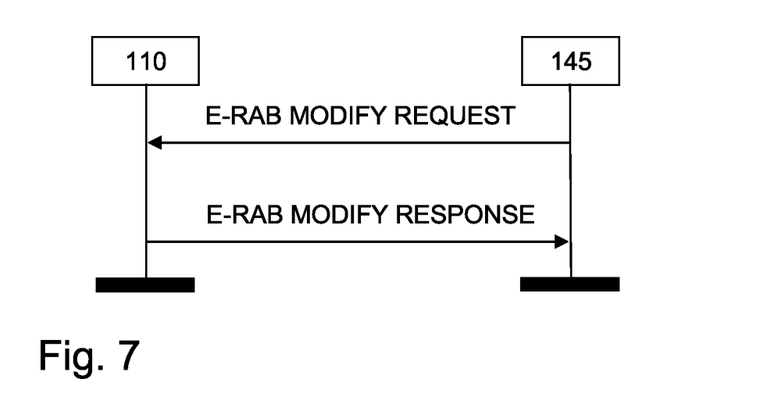
FIG. 7 is a flowchart depicting embodiments of a method in a core network node

An example of an E-RAB Modify procedure is shown in FIG. 7. The purpose of the E-RAB Modify procedure is to enable modifications of already established E-RABs for a given UE. The procedure uses UE-associated signaling. In this embodiment the core network node 145 initializes the E-RAB Modify procedure by sending an E-RAB modify request message to the network node 110. The network node 110 modifies the E-RABs according to the parameters included in the message. When the network node 110 has finished modifying the E-RABs it may send an E-RAB modify response message to the core network node 145. The E-RAB modify response message may comprise the result for all the requested E-RABs to be modified, such as a list of E-RABs which are successfully modified and, if any, a list of E-RABs which failed to be modified.

Figure 8:
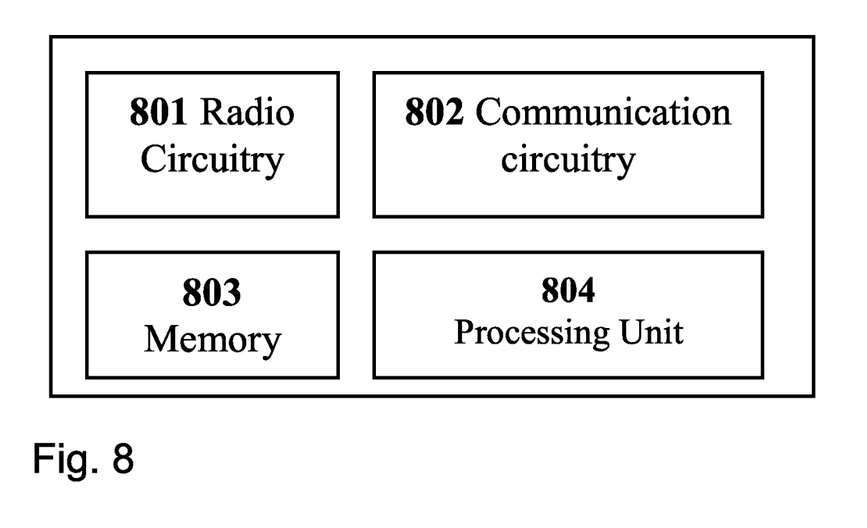
FIG. 8 is a schematic block diagram illustrating embodiments of a network node.

To perform the method actions for handling a relocation of data flow of a UE 130 from a first GW 141 to a second GW 142 described above in relation to FIG. 4, the network node 110 may comprise the following arrangement depicted in FIG. 8.

The network node 110 comprises a radio circuitry 801 to communicate with served UEs, a communication circuitry 802 to communicate with other radio network and core network nodes, a memory 803 to store information related to the E-RAB modify procedure, and a processing unit 804.

The network node 110 is configured to, or comprises the communication circuitry 802 being configured to, receive a message from a core network node 145, which is an E-RAB modify request message. The message comprises one or more parameters for the relocation of the data flow for one or more respective E-RABs. At least one of the parameters included in the message is a QoS parameter. The message further comprises an indication, indicating whether or not to ignore the QoS parameter. The communication circuitry 802 may be a wireless transceiver, comprised in the network node 110.

In some embodiments herein, the indication is a Boolean, the Boolean being comprised in an IE in the message. When the QoS parameter is to be ignored, the Boolean is set to "true". When the QoS is not to be ignored, the Boolean is set to "false". In a further embodiment the Boolean may not be included in the message when the QoS is not to be ignored.

In some embodiments the network node 110 may be configured to, or comprises the communication circuitry 802 which may be configured to, send an E-RAB modify response message to the core network node 145.

The network node 110 is further configured to, or comprises the processing unit 804 being configured to, ignore the QoS parameter in the message, when the QoS parameter is indicated to be ignored and otherwise, modify the QoS of the data flow according to the QoS parameter in the message.

In some embodiments the one or more parameters further comprises information about NAS-PDU. The network node 110 may further be configured to, or comprises the processing unit 804 which may be configured to, ignore the information about NAS-PDU when the QoS parameter is ignored.

The one or more parameters may further comprise a Transport Layer Address. In some embodiments the network node 110 further is configured to, or comprises the processing unit 804 being configured to, modify the address of the S-GW 143 for the respective E-RABs according to the Transport Layer Address comprised in the message. By modifying the address according to the Transport Layer Address, the S-GW 143 is redirected from one GW, such as the first GW 141, to another GW, such as the second GW 142.

In some embodiments, the one or more parameters may further comprise a TEID. The network node 110 may further be configured to, or comprises the processing unit 804 which may be configured to, forward subsequent uplink packets for the respective E-RABs to a second GW 142, according to the TEID comprised in the message. The second GW 142 may be L-GW being connected to a LHN.

In some embodiments, the network node 110 may further be configured to, or comprises the processing unit 804 which may further be configured to determine whether all E-RAB(s) in the E-RAB MODIFY REQUEST message has been handled or not.

The network node 110 may further comprise the memory 803 being configured to, store information related to the E-RAB modify procedure.

In a further embodiment, the network node 110 is configured to, or comprises the radio circuitry 801 being configured to communicate with the served UE 130.

Figure 9:
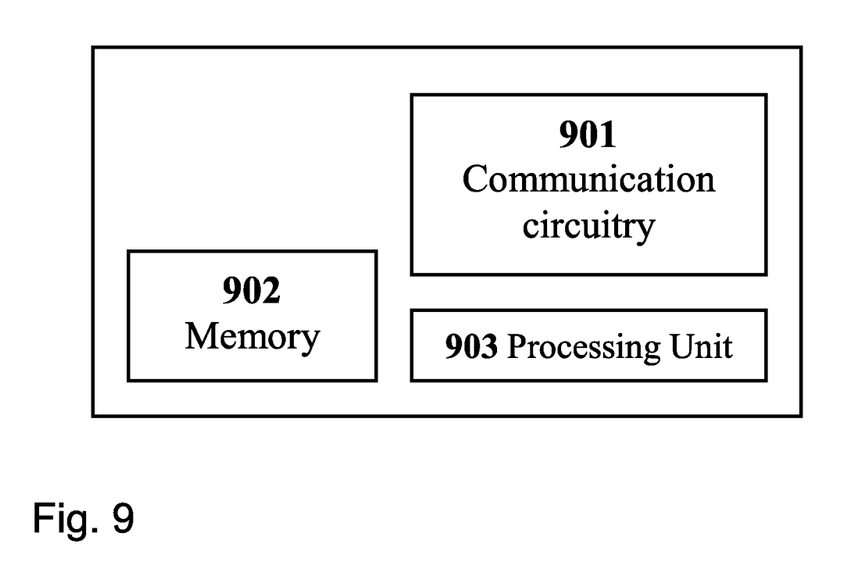
FIG. 9 is a schematic block diagram illustrating embodiments of a core network node.

To perform the method actions for assisting a network node 110 in relocating a data flow of a UE 130 from a first GW 141 to a second GW 142 described above in relation to FIG. 5, the core network node 145 comprises the following arrangement depicted in FIG. 9. The second GW 142 may, in some embodiments, be an L-GW being connected to a LHN.

The core network node 145 comprises a communication circuitry 901 to communicate with radio network nodes and other core network nodes, a memory 902 to store information related to the relocation of data flow, and a processing unit 903.

The core network node 145 is configured to, or comprises the communication circuit 901 being configured to, send a message to the network node 110, which message is an Enhanced Radio Access Bearer, E-RAB, modify request message. The message comprises one or more parameters for the relocation of the data flow for one or more respective E-RABs. At least one of the parameters included in the message is a QoS parameter. The message further comprises an indication, indicating whether or not to ignore the QoS parameter.

In some embodiments herein, the indication is a Boolean, the Boolean being comprised in an IE in the message. When the QoS parameter is to be ignored, the Boolean is set to "true". When the QoS is not to be ignored, the Boolean is set to "false". In a further embodiment the Boolean may not be included in the message when the QoS is not to be ignored.

The one or more parameters in the message may further comprise information about Non Access Stratum—Packet Data Unit (NAS-PDU), a Transport Layer Address and/or a TEID.

In a further embodiment, the core network node 145 may be configured to, or comprises the communication circuitry 901 which may be configured to, receive an E-RAB MODIFY RESPONSE message from the network node 110.

The core network node 145 may further be configured to, or comprises the processing unit 903 which may be configured to, manage the E-RAB MODIFY REQUEST message.

In a further embodiment, the core network node 145 may further be configured to, or comprises the memory 902 which may be configured to, store information related to the invention.

Support will be added to selectively offload IP traffic at a local network, with a functionality known as SIPTO@LN (stand-alone case). This requires one or more local stand-alone gateways having local connectivity to a set of network nodes 110, such as an eNB and/or HeNB. Such a network is also known as a Local Home Network (LHN). One of the building blocks of SIPTO@LN is the possibility by a core network node 145, such as an MME, to trigger the relocation of an S-GW 143 for a UE 130 independently from mobility, supporting the local stand-alone gateway. This functionality may be activated depending on the UE 130 subscription information.

Embodiments herein disclose a mechanism to independently signal both a relocation of any data flow in a packet connection from one GW to another and a modification of a QoS parameter of any data flow associated with the connection, in the same packet data message. Such a data flow may be an E-RAB.

As mentioned above, one possibility is to add an explicit indicator for the whole message when it carries an S-GW indication so that the included QoS parameters for all the E-RABs can be discarded. This allows the information for relocation of the S-GW 143 and the QoS modification to be sent in one single message, but it does not allow modifying the QoS of multiple E-RABs and relocating the S-GW at the same time.

In an embodiment, the core network node 145 sends the appropriate parameters for the S-GW relocation for the specific E-RAB in an E-RAB MODIFY REQUEST message. For each E-RAB it further includes an indication to indicate whether to ignore the QoS information for that particular E-RAB or not. This indication may be a Boolean which may be included in an IE of the message. Only if the Boolean is included and set to "true" for the E-RAB, the network node 110 ignores the QoS information for that E-RAB and acts on the others as per current protocol. In this way it is possible to signal S-GW relocation and QoS change for multiple E-RABs in the same message.

Thus, the described methods and apparatuses apply independently to each E-RAB ID included in the E-RAB MODIFY REQUEST message. That's one of the advantages of the invention: to be able to signal either change, or both at the same time, to any E-RAB independently in a single message.

Thanks to the provision of a mechanism that allows the core network node 145 to signal both the S-GW relocation and the QoS modification on the same message, a good signaling efficiency is obtained. It is possible to signal S-GW relocation and QoS change for multiple E-RABs in the same message. This leads to better signaling efficiency, since a one-shot modification of all the concerned E-RABs by the UE can be achieved. Also, full signaling flexibility is maintained, since the two functionalities are completely independent. It may also be possible to support one of the functionalities without the other. When the Ignore QoS IE is coded as a Boolean (i.e. a single bit), including it even for long lists of E-RABs does not add any overhead to the message, compared to the benefit that only a single message is needed to signal all the actions. Thanks to the use of criticality "reject" and the optional presence of the Boolean, network nodes 110 of older releases will reject the message with the new IE and fail the procedure without breaking existing functionality. The detection of the modified QoS parameters is performed with a single check on whether the Ignore QoS IE is included, i.e. if it is not included, ASN.1 message decoding is performed as currently, with no additional logic involved. This enables maximum decoding speed of the message.

The core network node 145, such as an MME, sends the appropriate parameters for the S-GW relocation for the specific E-RAB in the E-RAB MODIFY REQUEST message. For each E-RAB it includes a Boolean to signal whether to ignore the QoS information for that particular E-RAB or not. Only if the Boolean is included and set to "true" for the E-RAB, the network node 110, such as an eNB, ignores the QoS information for that E-RAB and acts on the other E-RABs as per current protocol. In this way it is possible to signal S-GW relocation and QoS change for multiple E-RABs in the same message.

The embodiments herein for handling a relocation of data flow of a UE 130 from a first GW 141 to a second GW 142 may be implemented through one or more processors, such as the processing unit 804 in the network node 110 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the in the network node 110. One such carrier may be in the form of a CD ROM disc. It is however feasible with other data carriers such as a memory stick. The computer program code may furthermore be provided as pure program code on a server and downloaded to the network node 110.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for handling a relocation of a data flow of a User Equipment (UE) from a first Gateway (GW) to a second GW, the method comprising:

receiving a message from a core network node, which message is an Enhanced Radio Access Bearer (E-RAB) modify request message and which message comprises one or more parameters for the relocation of the data flow for one or more respective E-RABs, wherein the one or more parameters comprises a Quality of Service (QoS) parameter, the message further comprising an explicit indication, indicating whether the QoS parameter is to be ignored;

when the QoS parameter is indicated to be ignored, ignoring the QoS parameter in the message, and otherwise, modifying a QoS of the data flow according to the QoS parameter in the message.

2. The method of claim 1, wherein the indication is a Boolean, the Boolean being comprised in an Information Element (IE) in the message and wherein the Boolean is set to true when the QoS parameter is to be ignored.

3. The method of claim 1, wherein the indication is a Boolean, the Boolean being comprised in an Information Element (IE) and wherein the Boolean is set to false when the QoS parameter is not to be ignored.

4. The method of claim 1, wherein the one or more parameters further comprises information about Non Access Stratum—Packet Data Unit (NAS-PDU) and wherein the ignoring the QoS parameter in the message further comprises ignoring the information about NAS-PDU.

5. The method of claim 1, wherein the one or more parameters further comprises a Transport Layer Address, and wherein the modifying the QoS of the data flow further comprises modifying the address of a Serving GW for the respective E-RABs according to the Transport Layer Address comprised in the message.

6. The method of claim 1 wherein the one or more parameters further comprises a Tunnel Endpoint Identifier (TEID) and the method further comprises forwarding, to a core network node, subsequent uplink packets for the respective E-RABs according to the TEID comprised in the message.

7. The method of claim 1, wherein the second GW is a Local Gateway (L-GW), the L-GW being connected to a Local Home Network (LHN).

8. A method in a core network node for assisting a network node in relocating a data flow of a User Equipment (UE) from a first Gateway (GW) to a second GW, the method comprising:
sending a message to the network node, which message is an Enhanced Radio Access Bearer (E-RAB) modify request message and which message comprises one or more parameters for the relocation of the data flow for one or more E-RABs, wherein the one or more parameters comprises one or more Quality of Service (QoS) parameters, the message further comprising an explicit indication, indicating whether the QoS parameters are to be ignored, wherein
when the QoS parameters are indicated to be ignored, it is an indication to the network node to ignore the one or more QoS parameters in the message, and
otherwise, it is an indication to the network node to modify a QoS of the data flow according to the one or more QoS parameters in the message.

9. The method of claim 8, wherein the indication is a Boolean, the Boolean being comprised in an Information Element (IE) and the Boolean is set to true when the QoS parameters are to be ignored.

10. The method of claim 8, wherein the indication is a Boolean, the Boolean being comprised in an Information Element (IE) and wherein the Boolean is set to false when the QoS parameters are not to be ignored.

11. The method of claim 8, wherein the one or more parameters further comprises information about Non Access Stratum—Packet Data Unit (NAS-PDU).

12. The method of claim 8, wherein the one or more parameters further comprises a Transport Layer Address.

13. The method of claim 8, wherein the one or more parameters further comprises a Tunnel Endpoint Identifier (TEID).

14. The method of claim 8, wherein the second GW is a Local Gateway (L-GW), the L-GW being connected to a Local Home Network (LHN).

15. A network node for handling a relocation of a data flow of a User Equipment (UE) from a first Gateway (GW) to a second GW, wherein the network node comprises processing circuitry configured to:
receive a message from a core network node, which message is an Enhanced Radio Access Bearer (E-RAB) modify request message and which message comprises one or more parameters for the relocation of the data flow for one or more respective E-RABs, wherein the one or more parameters comprises a Quality of Service (QoS) parameter, the message further comprising an explicit indication, indicating whether the QoS parameter is to be ignored,
when the QoS parameter is indicated to be ignored, ignore the QoS parameter in the message, and
otherwise, modify a QoS of the data flow according to the QoS parameter in the message.

16. The network node of claim 15, wherein the indication is a Boolean, the Boolean being comprised in an Information Element (IE) and wherein the Boolean is set to true when the QoS parameter is to be ignored.

17. The network node of claim 15, wherein the indication is a Boolean, the Boolean being comprised in an Information Element (IE) in the message and wherein the Boolean is set to false when the QoS parameter is not to be ignored.

18. The network node of claim 15, wherein the one or more parameters further comprises information about Non Access Stratum—Packet Data Unit (NAS-PDU) and wherein the network node further is configured to ignore the information about NAS-PDU when the QoS parameter is ignored.

19. The network node of claim 15, wherein the one or more parameters further comprises a Transport Layer Address, and wherein the network node further is configured to modify the address of a Serving GW (S-GW) for the respective E-RABs according to the Transport Layer Address comprised in the message.

20. The network node of claim 15 wherein the one or more parameters further comprises a Tunnel Endpoint Identifier (TEID) and the network node further comprises processing circuitry configured to forward, to a second GW, subsequent uplink packets for the respective E-RABs according to the TEID comprised in the message.

21. The network node of claim 15, wherein the second GW is a Local Gateway (L-GW), the L-GW being connected to a Local Home Network (LHN).

22. A core network node for assisting a network node in relocating a data flow of a User Equipment (UE) from a first Gateway (GW) to a second GW, wherein the core network node comprises processing circuitry configured to:
send a message to the network node, which message is an Enhanced Radio Access Bearer (E-RAB) modify request message and which message comprises one or more parameters for the relocation of the data flow for one or more E-RABs, wherein the one or more parameters comprises one or more Quality of Service (QoS) parameters, the message further comprising an explicit indication, indicating whether the QoS parameters are to be ignored, wherein
when the QoS parameters are indicated to be ignored, it is an indication to the network node to ignore the one or more QoS parameters in the message, and otherwise, it is an indication to the network node to modify a QoS of the data flow according to the one or more QoS parameters in the message.

23. The core network node of claim 22, wherein the indication is a Boolean, the Boolean being comprised in an Information Element (IE) and the Boolean is set to true when the QoS parameters are to be ignored.

24. The core network node of claim 22, wherein the indication is a Boolean, the Boolean being comprised in an Information Element (IE) in the message and wherein the Boolean is set to false when the QoS parameters are not to be ignored.

25. The core network node of claim 22, wherein the one or more parameters further comprises information about Non Access Stratum—Packet Data Unit, NAS-PDU.

26. The core network node of claim 22, wherein the one or more parameters further comprises a Transport Layer Address.

27. The core network node of claim 22, wherein the one or more parameters further comprise a Tunnel Endpoint Identifier (TEID).

28. The core network node of claim 22, wherein the second GW is a Local Gateway (L-GW) the L-GW being connected to a Local Home Network (LHN).

\* \* \* \* \*